US011782496B2

(12) United States Patent
Varshavsky et al.

(10) Patent No.: US 11,782,496 B2
(45) Date of Patent: *Oct. 10, 2023

(54) SMART CONTEXT SUBSAMPLING ON-DEVICE SYSTEM

(71) Applicant: Google LLC, Mountain View, CA (US)

(72) Inventors: Alexander Varshavsky, Summit, NJ (US); Bhaskar Mehta, Menlo Park, CA (US); Brian Coopersmith, Millburn, NJ (US); Giovanni Botta, Brooklyn, NY (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/975,042

(22) Filed: Oct. 27, 2022

(65) Prior Publication Data

US 2023/0050146 A1 Feb. 16, 2023

Related U.S. Application Data

(63) Continuation of application No. 16/496,225, filed as application No. PCT/US2017/068923 on Dec. 29, 2017, now Pat. No. 11,507,172.

(51) Int. Cl.
*G06F 1/3234* (2019.01)
*G06N 20/00* (2019.01)
(Continued)

(52) U.S. Cl.
CPC .......... *G06F 1/3234* (2013.01); *G06F 1/3209* (2013.01); *G06N 20/00* (2019.01);
(Continued)

(58) Field of Classification Search
CPC ..... G06F 1/3234; G06F 1/3209; G06N 20/00; H04W 8/10; H04W 60/04; H04M 2242/30
See application file for complete search history.

(56) References Cited

U.S. PATENT DOCUMENTS 4,438,296 A 3/1984 Smith
7,142,979 B1 11/2006 Shonk
(Continued)

FOREIGN PATENT DOCUMENTS

WO 2007136562 A2 11/2007
WO 2008098223 A2 8/2008
(Continued)

OTHER PUBLICATIONS

Invitation to Pay Additional Fees, Communication Relating to the Results of the Partial International Search, and Provisional Opinion for International Patent Application No. PCT/US2017/068923 dated Jun. 7, 2019. 22 pages.
(Continued)

*Primary Examiner* — Christine Ng
(74) *Attorney, Agent, or Firm* — Lerner David LLP

(57) ABSTRACT

The present disclosure provides a system for intelligently sampling information, such as location, activities, etc. on device. Sampling and uploading of background context is optimized using machine learning, such that battery usage is reduced, and quality of metrics based on the reported information is maintained or improved. A policy is generated based on the machine learning, the policy dictating how scanning and upload rates should change in response to conditions on the device.

20 Claims, 6 Drawing Sheets

(51) Int. Cl.
*G06F 1/3209* (2019.01)
*H04W 8/10* (2009.01)
*H04W 60/04* (2009.01)

(52) U.S. Cl.
CPC .............. *H04W 8/10* (2013.01); *H04W 60/04* (2013.01); *H04M 2242/30* (2013.01)

(56) References Cited

U.S. PATENT DOCUMENTS

| | | | |
|---|---|---|---|
| 7,149,504 B1 | 12/2006 | Weaver et al. | |
| 7,536,034 B2 | 5/2009 | Rhoads et al. | |
| 9,202,233 B1* | 12/2015 | Siegel | G06Q 30/0252 |
| 9,351,113 B1 | 5/2016 | Sun | |
| 11,507,172 B2* | 11/2022 | Varshavsky | G06F 1/3209 |
| 2004/0219932 A1 | 11/2004 | Verteuil | |
| 2006/0218271 A1* | 9/2006 | Kasslin | H04L 43/06 |
| | | | 709/224 |
| 2007/0178913 A1 | 8/2007 | Niemenmaa et al. | |
| 2008/0235040 A1* | 9/2008 | Ratliff | G06Q 10/10 |
| | | | 705/1.1 |
| 2010/0115050 A1 | 5/2010 | Sultenfuss et al. | |
| 2012/0230217 A1* | 9/2012 | Sawai | H04W 28/0268 |
| | | | 370/252 |
| 2013/0012234 A1 | 1/2013 | Tufty et al. | |
| 2013/0076523 A1* | 3/2013 | Kwan | A61B 5/1118 |
| | | | 340/8.1 |
| 2013/0084856 A1 | 4/2013 | Prasad et al. | |
| 2014/0029407 A1* | 1/2014 | Madonna | H04L 43/0811 |
| | | | 370/216 |
| 2014/0171106 A1 | 6/2014 | Cheng et al. | |
| 2015/0324824 A1* | 11/2015 | Meredith | H04W 4/029 |
| | | | 705/7.34 |
| 2017/0330078 A1* | 11/2017 | Koduru | G06N 5/01 |
| 2018/0233141 A1* | 8/2018 | Solomon | G06V 40/23 |
| 2018/0285957 A1* | 10/2018 | Ng | G06N 20/20 |
| 2019/0037387 A1* | 1/2019 | Hua | H04W 72/04 |
| 2019/0130436 A1* | 5/2019 | Ma | G06N 20/00 |

FOREIGN PATENT DOCUMENTS

| | | |
|---|---|---|
| WO | 2014190338 A2 | 11/2014 |
| WO | 2017053804 A1 | 3/2017 |
| WO | 2017172153 A1 | 10/2017 |

OTHER PUBLICATIONS

International Search Report and Written Opinion for International Application No. PCT/US2017/068923 dated Jul. 31, 2019. 25 pages.
International Preliminary Report on Patentability for International Application No. PCT/US2017/068923 dated Jul. 9, 2020. 17 pages.
Office Action for Chinese Patent Application No. 201780090558.5 dated Dec. 5, 2022. 9 pages.

* cited by examiner

SMART CONTEXT SUBSAMPLING ON-DEVICE SYSTEM

CROSS-REFERENCE TO RELATED APPLICATIONS

This application is continuation of U.S. patent application Ser. No. 16/496,225, filed on Sep. 20, 2019, which is a national phase entry under 35 U.S.C. § 371 of International Application No. PCT/US2017/068923 filed Dec. 29, 2017, the entire disclosure of which is incorporated herein by reference.

BACKGROUND

Currently, mobile devices may periodically sample and upload information, such as location information, to a remote server. Such information may be used in various applications, such as navigation, statistics, etc. Such reporting can, however, impact battery life of the mobile devices. In some systems, reporting rates are adjusted according to a simple set of heuristics, such as every 10 minutes if the device seems to be moving, or every 60 minutes if the device seems to be still. However, reporting in such manner is suboptimal, because it wastes battery by sampling location information that is redundant or uninteresting, and not sampling enough where the information would be more useful.

BRIEF SUMMARY

The present disclosure provides a system for intelligently sampling information, such as location, activities, etc. on device. Sampling and uploading of background context is optimized using machine learning, such that battery usage is reduced, and quality of metrics based on the reported information is maintained or improved. A policy is generated based on the machine learning, the policy dictating how scanning and upload rates should change in response to conditions on the device.

One aspect of the disclosure provides a method for improving reporting. The method includes receiving, from a plurality of mobile computing devices, data over a first time period, identifying, based on the received data, trigger conditions for reporting information, such that limiting reporting to the trigger conditions reduces consumption of battery power while preserving quality of the data, the trigger conditions including activities detected by the mobile computing devices, and generating, using the received data and the identified trigger conditions, a policy for reporting the information. The policy is provided to one or more mobile computing devices for execution.

In some examples, the data includes detected conditions and corresponding timestamp information. Reporting the information may include at least one of sampling the information or uploading the information to a remote server. Identifying the trigger conditions for reporting information may include executing a machine learning model. Identifying the trigger conditions for reporting information may also include training the received data against a cost function. The cost function may be based on a battery cost associated with power required to report the information, an offset cost associated with a distance between a previously reported location of the mobile computing device and a current location, and a path reconstruction cost. Training the received data may include using a tabular representation. The cost function may represent an expected total future cost of performing a particular action when one of the mobile computing devices is in a particular state. In some instances, the method may further include receiving additional data from the plurality of mobile computing devices over a second time period, updating the generated policy based on the additional data, and providing the updated policy to the one or more mobile computing devices for execution.

Another aspect of the disclosure provides a method for reporting by a mobile computing device. This method includes receiving, at the mobile computing device, a policy identifying one or more trigger conditions for reporting information, detecting, by the mobile computing device, an activity associated with the mobile computing device, determining whether the detected activity corresponds to the one or more trigger conditions, and reporting information when the detected activity corresponds to the one or more trigger conditions. Reporting the information may include at least one of sampling the information or uploading the information to a remote server. Detecting the activity may include detecting one or more conditions, such as connectivity conditions or movement conditions.

Another aspect of the disclosure provides a system for improving reporting. The system includes a memory storing data reported by a plurality of mobile computing devices over a first period of time, and one or more processors in communication with the memory. The one or more processors are configured to identify, based on the stored data, trigger conditions for reporting information, such that limiting reporting to the trigger conditions reduces consumption of battery power of reporting devices while preserving quality of the data, the trigger conditions including activities detected by the mobile computing devices, generate, using the stored data and the identified trigger conditions, a policy for reporting the information, and provide the policy to one or more mobile computing devices for execution.

In some examples, the data includes detected conditions and corresponding timestamp information. Reporting information may include at least one of sampling the information or uploading the information to a remote server. Identifying the trigger conditions for reporting information may include executing a machine learning model. Identifying the trigger conditions for reporting information may include training the stored data against a cost function. The cost function may represent an expected total future cost of performing a particular action when one of the mobile computing devices is in a particular state.

In some examples, the one or more processors are further configured to receive additional data from the plurality of mobile computing devices over a second time period, update the generated policy based on the additional data, and provide the updated policy to the one or more mobile computing devices for execution.

DETAILED DESCRIPTION

The present disclosure provides a machine learning approach for optimizing reporting by mobile devices. Sampling and uploading of background context is optimized, such that battery usage is reduced, and quality of metrics based on the reported information is maintained or improved. A policy is generated based on the machine learning, the policy dictating how scanning and upload rates should change in response to conditions on the device. For example, the machine learning is used to determine particular trigger conditions, which, when detected by a mobile device, cause the mobile device to report data. The reporting may include sampling and/or uploading. Sampling may be performed in response to some trigger conditions while uploading is performed in response to others. The trigger conditions may be particular activities inferred by sensor data, such as driving, parking, jogging, shopping, etc.

Example Systems

Figure 1:
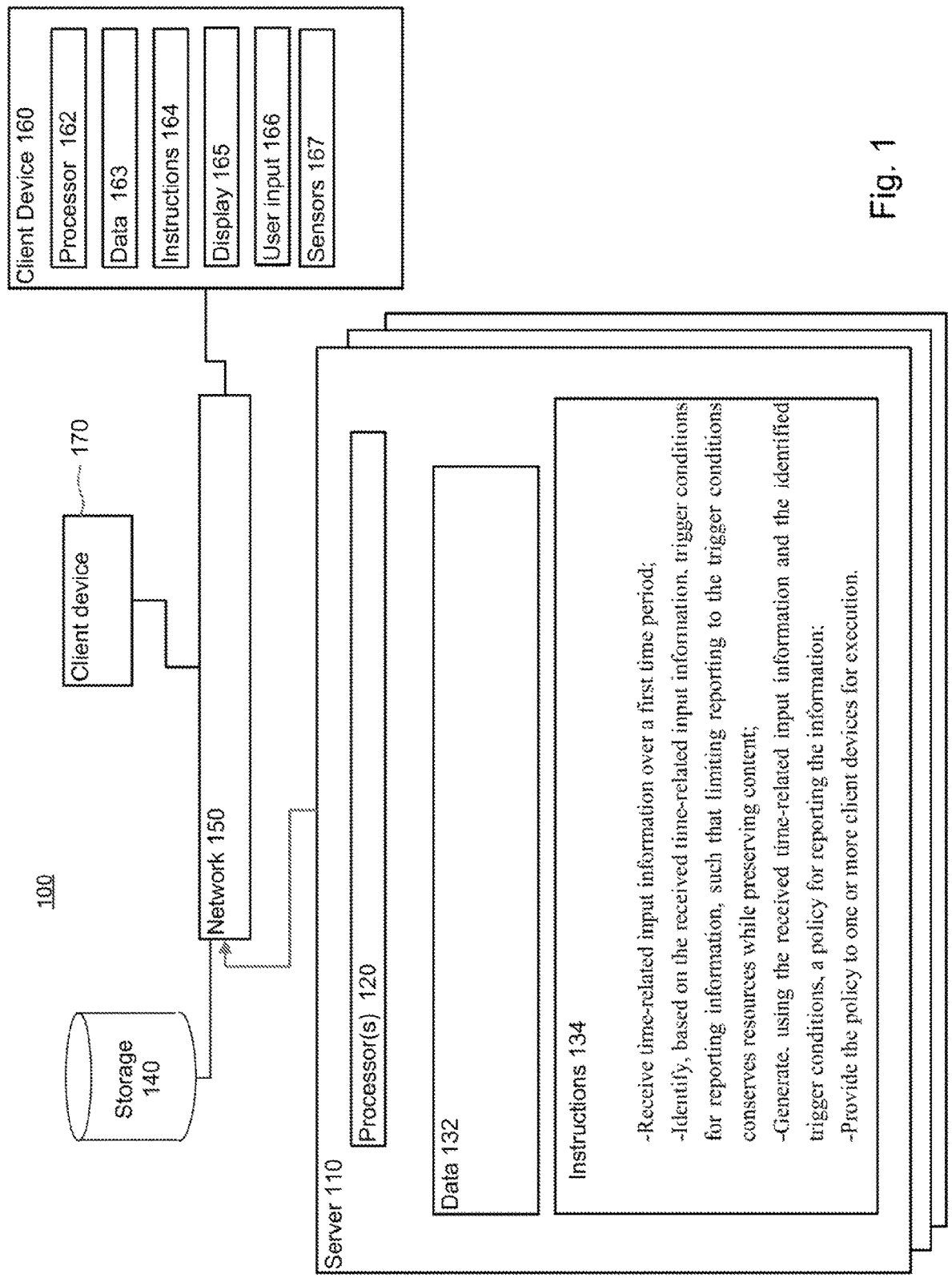
FIG. 1 is a block diagram of an example system according to aspects of the disclosure.

FIG. 1 illustrates an example system for optimizing reporting by mobile devices. It should not be considered as limiting the scope of the disclosure or usefulness of the features described herein. In this example, system 100 can include computing devices 110 in communication with one or more client devices 160, 170, as well as storage system 140, through network 150. Each computing device 110 can contain one or more processors 120, memory 130 and other components typically present in general purpose computing devices. Memory 130 of each of computing device 110 can store information accessible by the one or more processors 120, including instructions 134 that can be executed by the one or more processors 120.

Memory 130 can also include data 132 that can be retrieved, manipulated or stored by the processor. The memory can be of any non-transitory type capable of storing information accessible by the processor, such as a hard-drive, memory card, ROM, RAM, DVD, CD-ROM, write-capable, and read-only memories.

The instructions 134 can be any set of instructions to be executed directly, such as machine code, or indirectly, such as scripts, by the one or more processors. In that regard, the terms "instructions," "application," "steps," and "programs" can be used interchangeably herein. The instructions can be stored in object code format for direct processing by a processor, or in any other computing device language including scripts or collections of independent source code modules that are interpreted on demand or compiled in advance. Functions, methods, and routines of the instructions are explained in more detail below.

Data 132 may be retrieved, stored or modified by the one or more processors 220 in accordance with the instructions 134. For instance, although the subject matter described herein is not limited by any particular data structure, the data can be stored in computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The one or more processors 120 can be any conventional processors, such as a commercially available CPU. Alternatively, the processors can be dedicated components such as an application specific integrated circuit ("ASIC") or other hardware-based processor. Although not necessary, one or more of computing devices 110 may include specialized hardware components to perform specific computing processes, such as image recognition, object recognition, image encoding, tagging, etc.

Although FIG. 1 functionally illustrates the processor, memory, and other elements of computing device 110 as being within the same block, the processor, computer, computing device, or memory can actually comprise multiple processors, computers, computing devices, or memories that may or may not be stored within the same physical housing. For example, the memory can be a hard drive or other storage media located in housings different from that of the computing devices 110. Accordingly, references to a processor, computer, computing device, or memory will be understood to include references to a collection of processors, computers, computing devices, or memories that may or may not operate in parallel. For example, the computing devices 110 may include server computing devices operating as a load-balanced server farm, distributed system, etc. Yet further, although some functions described below are indicated as taking place on a single computing device having a single processor, various aspects of the subject matter described herein can be implemented by a plurality of computing devices, for example, in the "cloud." Similarly, memory components at different locations may store different portions of instructions 134 and collectively form a medium for storing the instructions. Various operations described herein as being performed by a computing device may be performed by a virtual machine. By way of example, instructions 134 may be specific to a first type of server, but the relevant operations may be performed by a second type of server running a hypervisor that emulates the first type of server. The operations may also be performed by a container, e.g., a computing environment that does not rely on an operating system tied to specific types of hardware.

Each of the computing devices 110, 160, 170 can be at different nodes of a network 150 and capable of directly and indirectly communicating with other nodes of network 150. Although only a few computing devices are depicted in FIG. 1, it should be appreciated that a typical system can include a large number of connected computing devices, with each different computing device being at a different node of the network 150. The network 150 and intervening nodes described herein can be interconnected using various protocols and systems, such that the network can be part of the Internet, World Wide Web, specific intranets, wide area networks, or local networks. The network can utilize standard communications protocols, such as Ethernet, WiFi, HTTP, protocols described in IEEE 802.11, cellular technology (such as GSM, CDMA, UMTS, EV-DO, WiMAX, LTE, etc.) protocols that are proprietary to one or more companies, and various combinations of the foregoing. Although certain advantages are obtained when information is transmitted or received as noted above, other aspects of the subject matter described herein are not limited to any particular manner of transmission of information.

As an example, each of the computing devices 110 may include web servers capable of communicating with storage system 140 as well as computing devices 160, 170 via the network 150. For example, one or more of server computing devices 110 may use network 150 to transmit and present information to a user on a display, such as display 165 of computing device 160. In this regard, computing devices 160, 170 may be considered client computing devices and may perform all or some of the features described herein.

Each of the client computing devices 160, 170 may be configured similarly to the server computing devices 110, with one or more processors, memory and instructions as described above. Each client computing device 160, 170 may be a mobile computing device intended for use by a user and capable of wirelessly exchanging data with a server over a network such as the Internet. By way of example only, client computing device 160 may be a mobile phone or a device such as a wireless-enabled PDA, a tablet PC, a netbook, a smart watch, a head-mounted computing system, or any other device that is capable of obtaining information via the Internet. As an example the user may input information using a small keyboard, a keypad, microphone, using visual signals with a camera, or a touch screen, etc.

The client computing devices 160, 170 may have all of the components normally used in connection with a mobile computing device such as a processor, memory (e.g., RAM and internal hard drives) storing data and instructions, a display such as display 165, and user input device 166 (e.g., input buttons, touch-screen, microphone, etc.). The client computing device may also include one or more sensors 167 for detecting conditions surrounding the mobile device. For example, the sensors 167 may include an image capture device, such as a camera for recording video streams and/or capturing images, speakers, a network interface device, and all of the components used for connecting these elements to one another. The sensors 167 may also include a location determination system, such as a GPS. Other examples of location determination systems may determine location based on wireless access signal strength, images of geographic objects such as landmarks, semantic indicators such as light or noise level, etc.

As will be described in further detail below in connection with FIG. 2, the client computing devices 160, 170 may sample information regarding surrounding conditions, such as by using the sensors 167, and may upload such information to the server 110 and/or the storage system 140. Such sampling or uploading may more generally be referred to as reporting. The client computing devices 160, 170 each have a privacy setting, which must be set to authorize such reporting. For example, a user of the client computing devices 160, 170 has an option to turn such reporting on or off, and may have an option to select which types of information are reported and which types are not. By way of example only, the user may allow reporting of an identification of connected access points, but not reporting of GPS coordinates. Moreover, privacy protections are provided for any data transmitted by the mobile device, including, for example, anonymization of personally identifiable information, aggregation of data, filtering of sensitive information, encryption, hashing or filtering of sensitive information to remove personal attributes, time limitations on storage of information, or limitations on data use or sharing. For example, detailed location information may only be stored for a relatively short-lived period of time in the storage system 140. Moreover, data may be anonymized and aggregated such that individual user data is not revealed. Rather than using any personal information to uniquely identify a mobile device, a hash of a unique identifier may be used. For example, the hash may be a cryptographic hash. The hash may have a high collision rate. The hash may be applied to a unique number or text string associated with mobile device. In this regard, no personal information is stored.

As with memory 130, storage system 140 can be of any type of computerized storage capable of storing information accessible by the server computing devices 110, such as a hard-drive, memory card, ROM, RAM, DVD, CD-ROM, write-capable, and read-only memories. In addition, storage system 140 may include a distributed storage system where data is stored on a plurality of different storage devices which may be physically located at the same or different geographic locations. Storage system 140 may be connected to the computing devices via the network 150 as shown in FIG. 1 and/or may be directly connected to any of the computing devices 110.

Storage system 140 may store data, such as reports from the client computing devices 160, 170 where privacy settings on the client computing devices 160, 170 have been set to authorize reporting. The reports may include, for example, location information, condition information, activity information, connectivity information, geofence information, battery information, or a variety of other types of information. The location information may include information such as GPS coordinates, nearby points of interest, or the like. Condition information may include, for example, weather information, detected light levels, sounds, air pressure, vibrations, etc. Activity information may include information determined based on detected conditions, location, or other information. For example, activities may include shopping, jogging, dining, etc. In some examples, the activity information may identify applications in use by the mobile computing device 160, 170. Connectivity information may include, by way of example, a Wi-Fi connection state, identification of connected access points, such as by MAC address, etc. In some example, the connectivity information may also include beacon scans from nearby devices. Geofence information may identify whether the mobile device 160, 170 is within a geographic area that corresponds to a residence or workplace. The device 160, 170 may in some examples suppress reporting of information when the device 160, 170 is within a home or work geofence. The battery information may identify a current battery level of the mobile computing device 160, 170, or whether the device is in a charging state.

Figure 2:
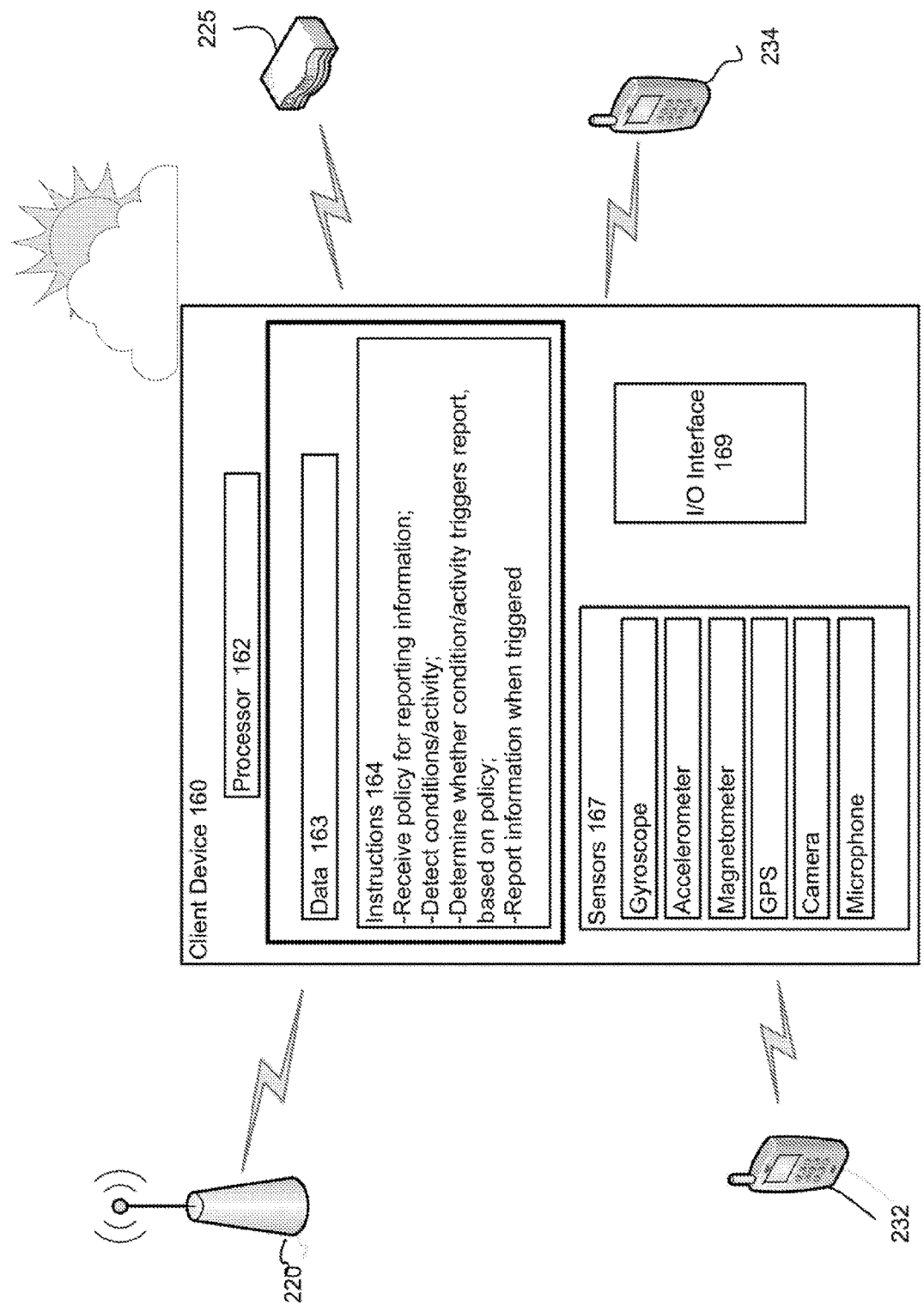
FIG. 2 is a block diagram of an example device and conditions according to aspects of the disclosure.

FIG. 2 is a block diagram of an example device and conditions according to aspects of the disclosure. As mentioned above, the client device 160 includes processor 162, memory including data 163 and instructions 164, and one or more sensors 167.

The instructions 164 are executable by the processor 162, for example, to perform a method including receiving a policy for reporting information, detecting surrounding conditions or activities, determining whether the detected condition or activity triggers reporting of information in accordance with the policy, and report information when it is triggered. The reporting may including at least one of sampling data or uploading information, or both. According to some examples, a first condition or activity may trigger the sampling of data, while a second different condition or activity triggers uploading information.

The sensors 167 may include, by way of example and not limitation, a gyroscope, accelerometer, magnetometer, GPS, camera, microphone, light sensor, motion sensor, etc. Such sensors may be used to detect a variety of different conditions, such as movement, weather conditions, sounds, nearby objects, electromagnetic fields, etc. The sensors 167 may in some examples recognize detailed information relating to the conditions. For example, the gyroscope and accelerometer may not only detect whether the device 160 is moving or not, but may determine whether the movement is linear or rotational, a direction of the movement, a speed of the movement, etc. Information from different types of the sensors 167 may also be used to determine conditions or activities. For example, a low reading from a light sensor in combination with a high pressure reading from a barometer may indicate rain. As another example, a particular speed and level of vibration may indicate that the device 160 is traveling on a bicycle, while received sounds or smells indicate that the device 160 is passing a restaurant.

The device 160 further includes an input/output (I/O) interface 169. I/O interface 169 may provide for communication, using analog or digital modulation, between the computing device 160 and other devices or networks. The I/O interface 169 may facilitate circuit-switched and/or packet-switched communication. For instance, I/O interface 169 may include a chipset and antenna arranged for wireless communication with a radio access network or an access point. I/O interface 169 may include a wireline interface, such as an Ethernet, Universal Serial Bus (USB), or High-Definition Multimedia Interface (HDMI) port. I/O interface 169 may also include a wireless interface, such as a Wi-Fi, or wide-area wireless interface (e.g., WiMAX or 3GPP Long-Term Evolution (LTE)). Other forms of physical layer interfaces and other types of communication protocols may also be used. Furthermore, I/O interface 169 may comprise multiple physical communication interfaces (e.g., a Wifi interface, a short range wireless interface, and a wide-area wireless interface), and may enable multiple simultaneous connections of different types.

The I/O interface 169 may be used to establish connectivity with one or more other computing devices. For example, in addition to the network 150, storage system 140, and server 110 discussed in connection with FIG. 1 above, the I/O interface 169 may be used to establish connections with access points, such as cellular access points 220, Wi-Fi access points 225, or any other type of access point with which the device 160 may establish a connection. The I/O interface may further establish connection with one or more other mobile computing devices 232, 234. The I/O interface 169 may further be used to detect beacons or radio frequency identification (RFID) tags, which may be positioned at any of a number of locations for any of a variety of reasons. For example, such beacons or RFID tags may be positioned in stores to determine a number of potential customers, in an advertising space to determine a number of viewers of the advertisement, etc.

I/O interface 169 may be used to determine connectivity information, which may further be used to determine conditions or activities associated with the device 160. For example, a number of other computing devices moving in close proximity with the device 160 may suggest that the device 160 is on a public train or a busy sidewalk. More precise determinations can be made when combined with other sensor information, such as noise level, vibrations, speed, etc. As another example, a number of other detected computing devices in close proximity, but a weak GPS signal and low light level, may suggest that the device 160 is in a locker room at a fitness club. In further examples, an identification of a particular access point, such as a MAC address, may provide location information or suggest a particular activity, such as eating at a restaurant associated with the MAC address of the access point.

While several examples of how various types of detected information can be used separately or in combination to determine conditions surrounding the device 160 or activities, it should be understood that any number of various activities or conditions can be determined using various inputs.

The policy generated by the server 110 may determine that it is most useful and cost effective for the mobile device 160 to only report information under a particular set of conditions or activities. By way of example only, the device 160 may only sample information when it determines that it is moving in a public place, and has more than a first predetermined percentage of battery life. As another example, the device 160 may only sample if there are at least a predetermined number of points of interest within a predetermined range. As another example, the device 160 may pause sampling and only resume sampling once a change in weather conditions is detected. As yet a further example, the device 160 may only upload information when it is connected to a power source or has greater than a second predetermined percentage of battery life.

Figure 3:
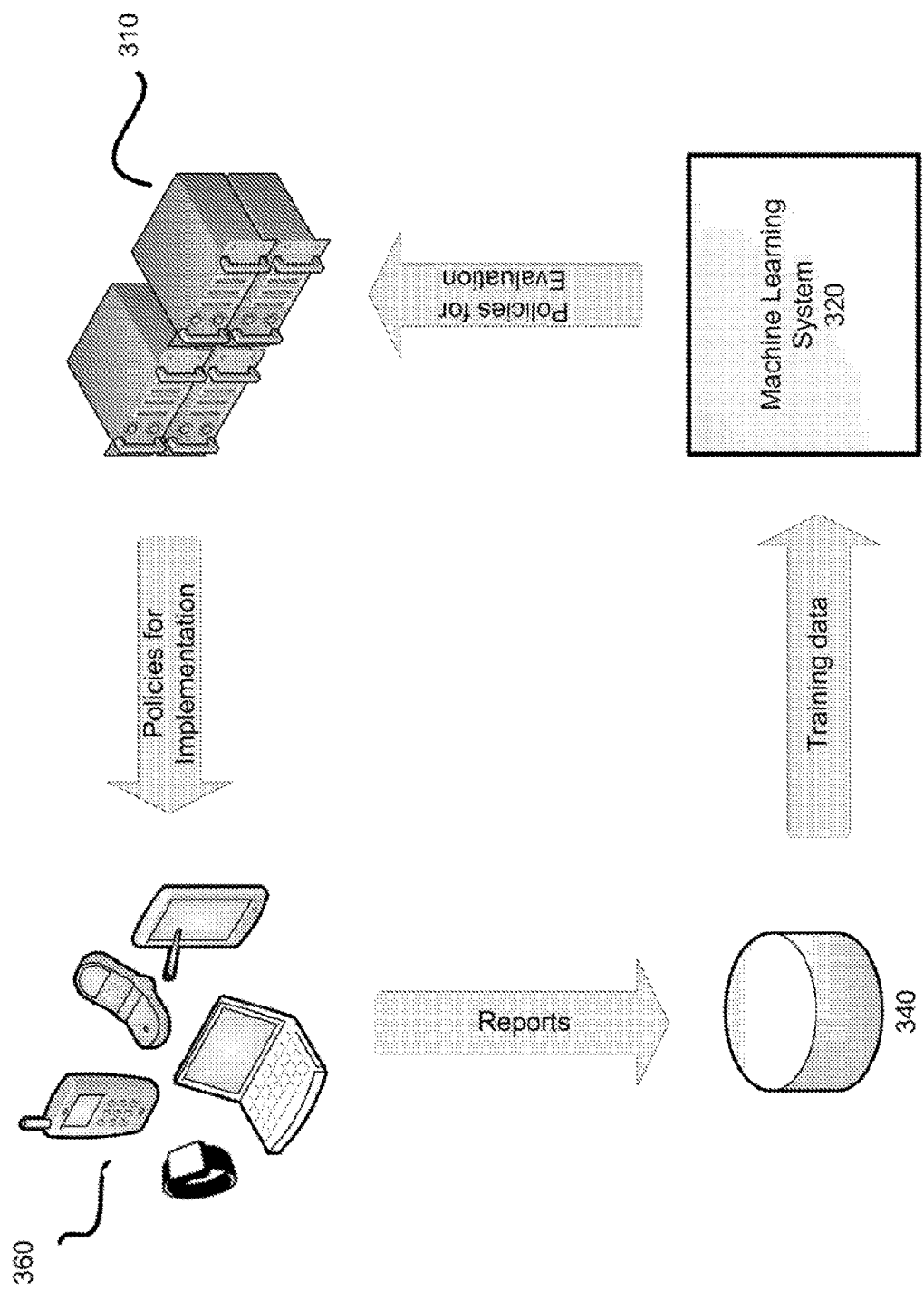
FIG. 3 is an example flow diagram illustrating transmission of information according to aspects of the disclosure.

FIG. 3 is an example flow diagram illustrating transmission of information according to aspects of the disclosure. Various data gathered by mobile devices 360, with user permission, is transmitted to database 340. The data may be transmitted with a corresponding timestamp, such as a timestamp indicating when the information was sampled. The database 340 may collect data from various sources over an extended period of time. Though not shown, the database 340 may be available to any of the number of systems and applications that use such data for various purposes. For example, the database 340 may be accessible by maps-related applications, navigation-related applications, weather-related applications, advertising-related applications, etc.

All or a portion of the data stored in database 340 may be used by machine learning system 320 to identify trigger activities or conditions for reporting data by a mobile device. The trigger activities or conditions may be identified such that limiting reporting, including sampling and/or upload, of data to the trigger activities/conditions would optimize battery life of the mobile device as well as usefulness of the data. For example, regarding usefulness of the data, it may be determined whether an accuracy and frequency and quantity of the data is sufficient to accurately infer location and activity data. The sufficiency of the data reported in response to the trigger conditions or activities should, for example, be comparable to data reported irrespective of a battery life optimization.

According to some examples, the machine learning system 320 may simulate different sampling and upload strategies as if they were running on a mobile device. For example, reporting policies generated based on data in the database 340 may be tested and evaluated prior to executing the reporting policies on the mobile devices 360. The machine learning system 320 may run an initial policy determined based on data existing in the database 340, and allow learning to explore new policies by simulating new location histories. In some examples, new policies may be explored simultaneously with the evaluation of other policies.

The machine learning may include training of the data using a cost function, for example, planning for total expected future cost. In some examples, the cost function may incorporate full semantic location and activity inferences, as well as actual amount of battery used. In other examples, a simplified cost function may be used for fast computation while approximating a same quality of metrics. For example, the cost function may be a sum of distinct sub-costs, such as battery, offset, and path reconstruction. In some examples, additional sub-costs may include Wi-Fi and detected activity reports, as discussed further below. Accordingly, a cost function may be:

$$C(a,s,L) = \alpha BB(L') + \alpha OO(L,L') + \alpha RR(L,L')$$

In this equation, C(a,s,L) is the cost of performing an action a when a device is in state s as computed from historic data L. Tuning parameters a provide for representation of a relative importance of each of the sub-costs. Not all costs will apply to all actions. For example, some costs may only apply to upload actions and not to sampling rate changes. While battery costs may apply to all actions, for example, offset costs and path reconstruction costs may only apply to uploading. Because the machine learning system 320 is optimizing for total expected future cost, it should learn, for example, that bad sampling rates eventually lead to bad upload costs.

The battery costs may represent simple relative power costs for each action. The battery costs may be estimated from a number of location reports, and a frequency of batching.

The offset cost may be a distance d from a last uploaded location, lu, to a user's current, actual location. The offset cost function may be:

$$O(L, L') = \frac{1}{T-u} \sum_{t=u+1}^{T} d(l_u, l_t)$$

Since the user's current location is unknown, it may be approximated with each location lt in the database 340 from a time of the last upload u to a time of current upload T. In some examples, the model uploads once per batch, such that the batching rate directly controls the upload rate. However, it should be understood that uploading and batching rates may be independent, Offset will be high when the user is moving. The battery cost of upload actions should prevent the system from learning to upload too frequently, and will find a more nuanced balance between speed of motion and upload rates, as opposed to a hard threshold. The distance may be normalized by an estimated velocity of the device. For example:

$$\hat{O}(L, L') = \frac{1}{T-u} \sum_{t=u+1}^{T} d(l_u, l_t)/v_t$$

where $v_t = d(l_t, l_{t-1})/(c_t - c_{t-1})$ is the estimated velocity of the device at time t (and $c_t$ is the timestamp of $l_t$). The units of Ô are time, and it can be thought of as the "effective freshness" of $l_u$. As such, when the device is moving slowly, the offset counts more than when the device is moving quickly.

Path reconstruction cost relates to an ability to reconstruct a user's path based on a sufficiency of location reports in an upload. The path reconstruction cost can be defined as:

$$R(L, L') = \frac{1}{|L| - |L'|} \sum_{l \notin L'} d(l, k, m))$$

where L is the full set of location reports and L' is the set of location reports with some reports omitted.

Figure 4:
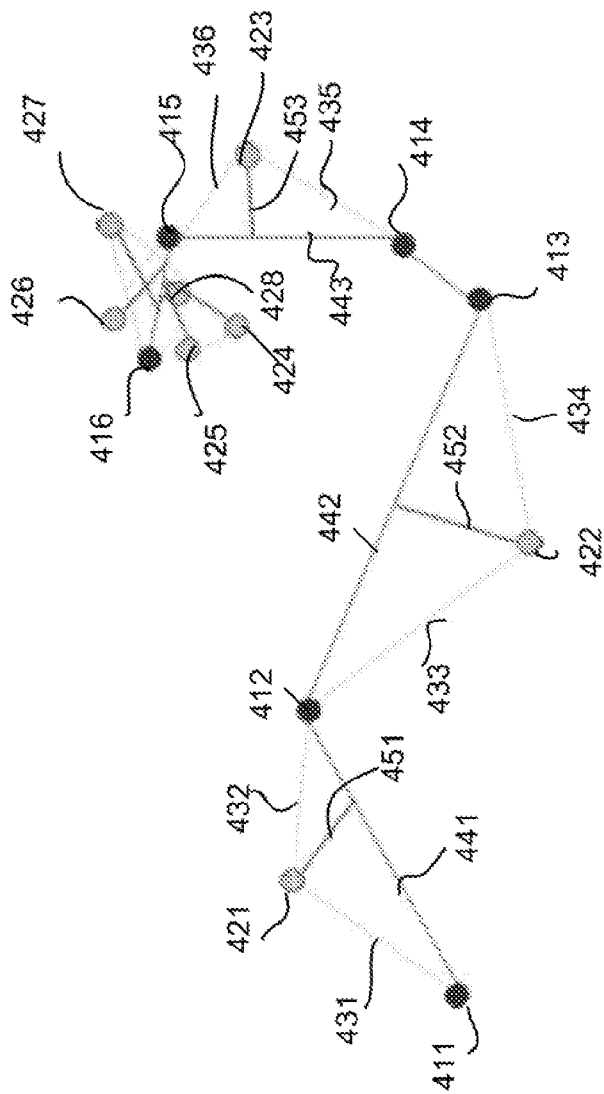
FIG. 4 illustrates an example of path reconstruction according to aspects of the disclosure.

In FIG. 4, points 411-416 and 421-428 represent a full set of location reports, which may each have corresponding timestamps, enabling a reconstruction of a user's path from one point to the next. Some reports, and thus points, are omitted to determine a model for reduced reporting, and a new path is generated connecting the points 411-416. In the example shown, points 411-416 represent locations in reports retained in L'. Points 421-428 represent locations in dropped reports. For a point 1 in L but not in L', k and m are the points in L' immediately before and after 1 (in time). d is the distance that 1 has to be moved to fall onto the line segment (where linear interpolation would put it) between k and m. For example, in FIG. 4, lines 431-436 are dropped, and new lines 441-443 are created to connect the remaining points 411-416. Distance lines 451-453 represent the distance d that each respective dropped point 421-428 must be move to align with new path lines 441-443. R(L, L') in the equation above represents an average length of lines 451-453. Distances below a threshold may be ignored so that the path reconstruction cost has no effect on points discarded when the device is mostly stationary.

Another example cost is a Wi-Fi report cost. When a user is in a place-dense area, the policy should receive enough WiFi scans to assist place inference. The WiFi report cost can be defined as the cosine similarity between the mean WiFi vectors built from the set of filtered and unfiltered scans:

$$W(L,L') = w(L') \cdot w(L) / \|w(L')\| \|w(L)\|$$

where w(L) is the average of all WiFi scans in set L. In other examples, the Wi-Fi report cost can be determined based on how much space of Wi-Fi scans is traversed, analogous to the path reconstruction cost.

Similar to how WiFi scans are used in place inference, detected activity reports (DARs) may be used in activity inference. The machine learning system 320 may ensure that enough DARs are included in an upload so that activity and place can still be accurately inferred.

While a number of types of cost have been described above, it should be understood that a variety of other types of cost may additionally or alternatively be used for training data from the database 340.

The machine learning system 320 executes a machine learning model, which learns the expected total future cost of performing an action. The model itself could be a neural network, a simple linear model, or even a table-lookup. Any regression method capable of learning the cost function can be considered. Once an estimate of the cost function has been fit, it can be turned into a policy by always choosing the action that minimizes the cost in a given state s. Example models include tabular regression models, linear models, etc.

A training procedure for a tabular model may follow a procedure for each device in a subset of history data in the database 340. For example, the training procedure may initialize the cost function with all zeros, and repeat a sequence of (i) running a policy defined by the cost function for one action and observing a resulting state and a cost, and (2) updating the cost function. The updated cost function may be Q(s,a)=Q(s, a)+λ, [(c+γQ(s', a'))−Q(s, a)], where a' is the action that maximizes Q(s',a') and λ is a learning rate. This sequence may be repeated until convergence. Convergence may be reached when a maximum change to any Q(s,a) falls below a pre-specified threshold.

As mentioned above, the policies can be evaluated prior to implementation in the mobile devices 360. For example, the policies may be evaluated at servers 310, using simulated data, and further adjustments to the policies may be made based on the evaluation.

When a battery-saving, quality-neutral policy is identified it can be launched and provided to the mobile devices 360. We can then track real-world battery impact and data quality can be determined based on execution of the policy by the mobile devices 360.

Example Methods

Further to the example systems described above, example methods are now described. Such methods may be performed using the systems described above, modifications thereof, or any of a variety of systems having different configurations. It should be understood that the operations involved in the following methods need not be performed in the precise order described. Rather, various operations may be handled in a different order or simultaneously, and operations may be added or omitted.

Figure 5:
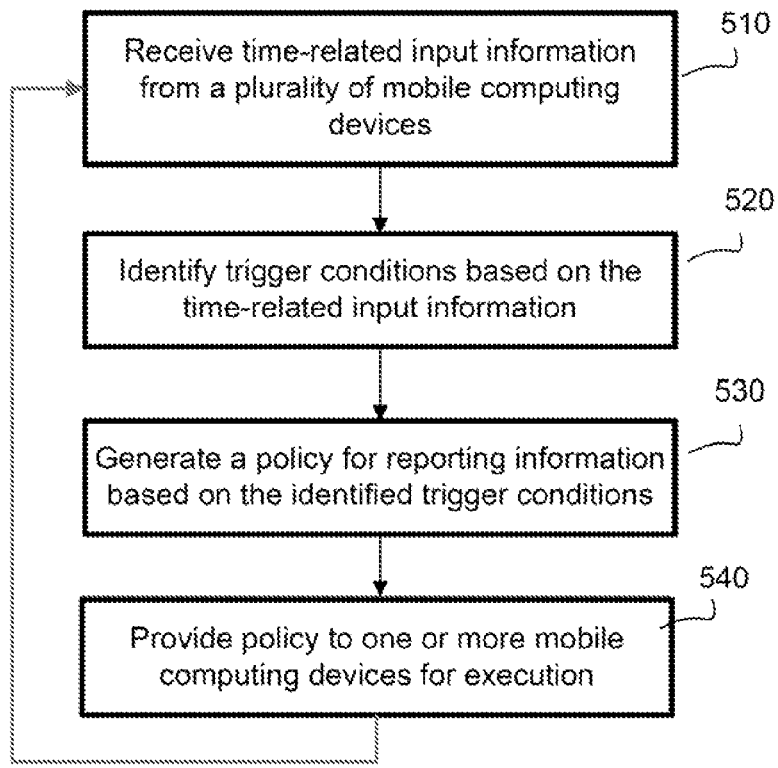
FIG. 5 is a flow diagram illustrating an example method according to aspects of the disclosure.

FIG. 5 is a flow diagram illustrating an example method 500 according to aspects of the disclosure. The method 500 may be performed by, for example, one or more server computing devices and/or machine learning systems.

In block 510, time-related input information, such as timestamped data, is received from a plurality of mobile computing devices. The time-related input information may be temporarily stored in a database prior to be received at the server/machine learning system. The data includes only information authorized by users of the mobile devices. Moreover, privacy protections are provided for any user data transmitted by the mobile device, including, for example, anonymization of personally identifiable information, aggregation of data, filtering of sensitive information, encryption, hashing or filtering of sensitive information to remove personal attributes, time limitations on storage of information, or limitations on data use or sharing. Moreover, data may be anonymized and aggregated such that individual user data is not revealed. No personal information is stored.

In block 520, trigger conditions are identified based on the time-related input information. For example, a machine learning model is executed using the received time-related input information. The model may apply a cost function, such that the model is trained to minimize cost while optimizing quality of reported data. The cost function may be based on one or more different types of costs, such as costs relating to different types of data. For example, the cost may relate to location data, activity data, etc. Any of a variety of machine learning models may be used, such as a tabular regression model, a linear model, etc. As a result of the model, it may be determined which conditions or activities should trigger a report of data by a mobile computing device, such that a battery life of the mobile computing device is preserved while most useful data is reported.

In block 530, a policy is generated for reporting information based on the identified trigger conditions. For example, the policy may dictate that a mobile device samples information when a first trigger condition is detected, and uploads information when a second trigger condition is detected.

In block 540, the policy is provided to one or more mobile devices for execution. When executed by the mobile devices, the reported data may be used to further train the machine learning model. In this regard, the policy may be further refined and updated.

Figure 6:
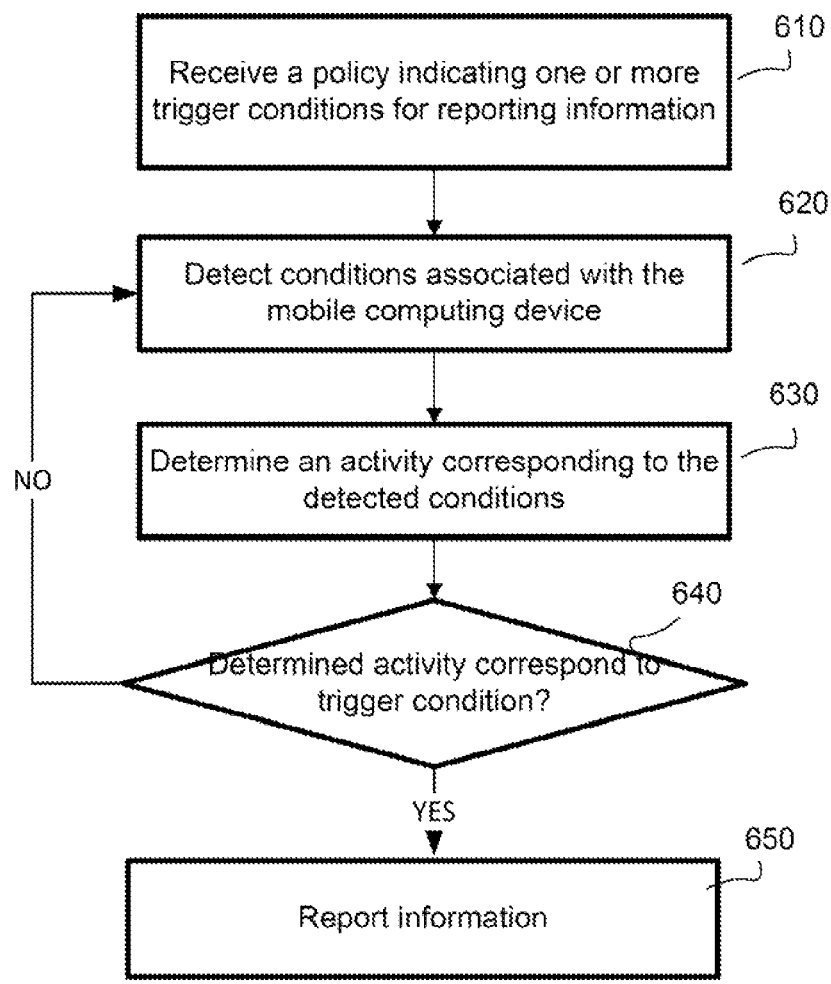
FIG. 6 is a flow diagram illustrating another example method according to aspects of the disclosure.

FIG. 6 is a flow diagram illustrating another example method 600 according to aspects of the disclosure. The method 600 may be performed by, for example, a mobile computing device.

In block 610, a policy is received, the policy indicating one or more trigger conditions for reporting information. The policy may be, for example, the policy generated in block 530 of FIG. 5.

In block 620, the mobile computing device detects surrounding conditions. The conditions may include, for example, weather conditions, connectivity information, location, sounds, vibration, movements, etc.

In block 630, the mobile computing device may determine an activity corresponding to the detected conditions. For example, it may be determined based on particular connected devices, movement, etc. that a user of the mobile computing device is walking around a shopping mall or performing another activity.

In block 640, it is determined whether the detected activity corresponds to a trigger condition in the policy. If so, the method 600 proceeds to report information in block 650. For example, the device may sample data, or upload a batch of sampled data. In no detected conditions correspond to trigger conditions in the received policy, however, the method 600 may return to block 620 and continue detecting surrounding conditions.

The example systems and methods described above are beneficial in that they provide for reducing battery consumption, while still providing for obtaining accurate and useful information. Moreover, by reducing the reported information, resources such as network bandwidth and database storage may be conserved.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for reporting by a mobile computing device, the method comprising:
   detecting, by the mobile computing device, an activity associated with the mobile computing device;
   determining whether the detected activity corresponds to one or more trigger conditions in a first policy for reporting information, wherein the first policy is based on training data against a cost function associated with one or more activities; and
   reporting information when the detected activity corresponds to the one or more trigger conditions, wherein the information is used for updating the first policy by updating the cost function.

2. The method of claim 1, wherein the reporting information comprises at least one of sampling the information or uploading the information to a remote server.

3. The method of claim 1, wherein detecting the activity comprises detecting one or more conditions, including connectivity conditions.

4. The method of claim 1, wherein detecting the activity comprises detecting one or more conditions, including movement conditions.

5. The method of claim 1, wherein the cost function represents an expected total future cost of performing a particular action when the mobile computing device is in a particular state.

6. The method of claim 1, wherein the cost function is based on a battery cost associated with power required to report the information, an offset cost associated with a distance between a previously reported location of the mobile computing device and a current location, and a path reconstruction cost.

7. The method of claim 6, wherein the training data includes detected conditions and corresponding timestamp information.

8. A mobile computing device, comprising:
a memory;
one or more processors in communication with the memory, the one or more processors configured to:
  detect an activity associated with the mobile computing device;
  determine whether the detected activity corresponds to one or more trigger conditions in a first policy for reporting information, wherein the first policy is based on training data against a cost function associated with one or more activities; and
  report information when the detected activity corresponds to the one or more trigger conditions, wherein the information is used for updating the first policy by updating the cost function.

9. The mobile computing device of claim 8, wherein the reporting information comprises at least one of sampling the information or uploading the information to a remote server.

10. The mobile computing device of claim 8, wherein detecting the activity comprises detecting one or more conditions, including connectivity conditions.

11. The mobile computing device of claim 8, wherein detecting the activity comprises detecting one or more conditions, including movement conditions.

12. The mobile computing device of claim 8, wherein the cost function represents an expected total future cost of performing a particular action when the mobile computing device is in a particular state.

13. The mobile computing device of claim 8, wherein the cost function is based on a battery cost associated with power required to report the information, an offset cost associated with a distance between a previously reported location of the mobile computing device and a current location, and a path reconstruction cost.

14. The mobile computing device of claim 13, wherein the training data includes detected conditions and corresponding timestamp information.

15. A non-transitory computer-readable medium storing instructions executable by one or more processors for performing a method comprising:
  detecting an activity associated with a mobile computing device;
  determining whether the detected activity corresponds to one or more trigger conditions in a first policy for reporting information, wherein the first policy is based on training data against a cost function associated with one or more activities; and
  reporting information when the detected activity corresponds to the one or more trigger conditions, wherein the information is used for updating the first policy by updating the cost function.

16. The non-transitory computer-readable medium of claim 15, wherein the reporting information comprises at least one of sampling the information or uploading the information to a remote server.

17. The non-transitory computer-readable medium of claim 15, wherein detecting the activity comprises detecting one or more conditions, including connectivity conditions.

18. The non-transitory computer-readable medium of claim 15, wherein detecting the activity comprises detecting one or more conditions, including movement conditions.

19. The non-transitory computer-readable medium of claim 15, wherein the cost function represents an expected total future cost of performing a particular action when the mobile computing device is in a particular state.

20. The non-transitory computer-readable medium of claim 15, wherein the cost function is based on a battery cost associated with power required to report the information, an offset cost associated with a distance between a previously reported location of the mobile computing device and a current location, and a path reconstruction cost.

* * * * *